United States Patent [19]
Holtzberg

[11] Patent Number: 6,103,156
[45] Date of Patent: *Aug. 15, 2000

[54] METHOD FOR RAPID PRODUCTION OF STRUCTURAL PROTOTYPE PLASTIC PARTS

[75] Inventor: Matthew W. Holtzberg, 55 Copper Hill Park, Ringwood, N.J. 07456

[73] Assignee: Matthew W. Holtzberg, Ringwood, N.J.

[*] Notice: This patent is subject to a terminal disclaimer.

[21] Appl. No.: 08/877,410

[22] Filed: Jun. 16, 1997

[51] Int. Cl.⁷ ..................................................... B29C 1/14
[52] U.S. Cl. ...................... 264/102; 264/219; 264/236; 264/299; 264/319
[58] Field of Search ........................ 264/220, 225, 264/227, 226, 102, 219, 271, 1, 279, 299, 319, 331.13, 331.15, 236

[56] References Cited

U.S. PATENT DOCUMENTS

| | | | |
|---|---|---|---|
| 3,222,443 | 12/1965 | Dames, Jr. et al. | 264/313 |
| 3,504,079 | 3/1970 | Hall | 264/225 |
| 3,975,479 | 8/1976 | McClean | 264/102 |
| 4,355,128 | 10/1982 | Mercer | 524/423 |
| 4,403,066 | 9/1983 | Brode et al. | 524/876 |
| 4,578,448 | 3/1986 | Brode et al. | 528/139 |
| 4,588,420 | 5/1986 | Charvat | 264/219 |
| 4,615,855 | 10/1986 | Orlowski et al. | 264/227 |
| 4,677,020 | 6/1987 | Takagi et al. | 264/271.1 |
| 4,708,836 | 11/1987 | Gain et al. | 264/227 |
| 4,848,292 | 7/1989 | Holtzberg | 123/193 CH |
| 4,990,292 | 2/1991 | Hattori et al. | 264/226 |
| 5,213,747 | 5/1993 | Lippert | 264/226 |
| 5,849,229 | 12/1998 | Holtzberg | 264/102 |

FOREIGN PATENT DOCUMENTS

| | | | |
|---|---|---|---|
| 1181617 | 8/1986 | Japan | 264/511 |

*Primary Examiner*—Jan H. Silbaugh
*Assistant Examiner*—Stefan Staicovici
*Attorney, Agent, or Firm*—Hoffman & Baron, LLP

[57] ABSTRACT

A method for producing composite, structural plastic prototype parts, having visual and structural characteristics equivalent to those of an actual part to be commercially produced using existing soft tools, including wax, plaster, plastic, spray-metal, and rubber molds ordinarily used for visualization model making, developed using the latest rapid prototyping techniques. Short length fibers reinforcing low viscosity thermoset resins, and in particular resole phenolics, provides a pourable low bulk density polymer compound with minimal externally applied thermal requirements during molding and post cure when required.

15 Claims, 5 Drawing Sheets

METHOD FOR RAPID PRODUCTION OF STRUCTURAL PROTOTYPE PLASTIC PARTS

BACKGROUND

This invention relates to the rapid fabrication of prototypes, and in particular to molding these prototypes in composite, structural plastics.

In today's rapidly changing technological environment the ability to move from the conception of a product to full scale product development in as short a period of time as is possible is obviously of critical importance in many industries. In most cases this involves an early step of producing at least a non-functional, visual display prototype of the object(s) to be manufactured. Prior to recent computer developments in prototyping, wood forms would be machined to provide the form of the object so that a wax, plastic or rubber mold could be quickly made in order to produce at least a few three dimensional objects to simulate the final article to be manufactured. Today, computer aided design (CAD) is frequently employed for at least rapid visualization of an article to be manufactured. While enormously useful to engineers studying the best production methods for the object, CAD has been further improved so as to actually produce a three dimensional object for handling, visualization, and even limited suitability testing. These CAD techniques include steriolithography (SLA); laminated object manufacturing (LOM); selective laser sintering(SLS); fused deposition modeling(FDM) and solid ground curing (SGC). These techniques use either powder, liquid or sheets of polymers or other materials and are sequentially formed together, eventually producing a prototype of the desired object. For virtually all of these rapid prototype fabrications, including the prior "soft tooling", and the up to the minute CAD prototype production methods, the result is a prototype with relatively low temperature resistance and strength. While extremely useful at the early visual stage of product development, these prototypes cannot be used to fully evaluate the functionality of a finished product.

Obviously if a material and casting process were developed so that a structural part with equivalent functional properties to the ultimate finished product could be easily prototyped, such as, for example, utilizing the above soft tooling or CAD prototype production methods, a major breakthrough in reducing the design cycle, time-to-market would be accomplished. However, because of the temperatures of most molten metals or the heat and pressure required for structural grade, fiber reinforced plastics, this has heretofore been impossible. Additionally, if this material and casting process could be used in the fabrication of the molds themselves, prototype and production runs would greatly benefit by the elimination of costly "hard" steel tooling, mold costs.

A typical example of current, prototype fabrication can be found in the automobile industry. If a prototype of an intake manifold, for example, is required, an initial model would be made most probably using steriolithography (SLA). However, to test the functionality of such a prototype, automotive design engineers then have to make a steel mold and inject nylon to produce that design in plastic so it will withstand high temperatures and stresses. A one step, inexpensive procedure, would, of course, offer important economic advantages.

In copending U.S. application Ser. No. 08/714,813, now U.S. Pat. No. 5,849,229, the disclosure of which is hereby incorporated by reference, a method for molding composite, structural plastic objects in molds traditionally used in foundries for molding metal parts is described. This same basic method can be employed in the present invention to produce not only inexpensive prototypes utilizing soft tooling or the developing, rapid prototyping techniques, but also to form molds suitable for structural, prototype or final product fabrication. Thus a low cost and rapidly developed, molded prototype part can be used by design engineers not only to visualize the object in a hands-on, three dimensional representation, but also to test the object in the actual environment to which the finished product is going to be exposed. Extremely important cost savings are realized both in fabrication of the prototype and in time saved in bringing a new product to market.

It is therefore a primary object of the invention to provide a low cost method for producing structural, composite plastic prototype parts.

An additional object of the invention is to provide a method for utilizing soft tooling and modern day, rapid prototyping techniques in order to fabricate structural, composite plastic prototype parts.

A further object of the invention is to provide a method for utilizing molds fabricated in wax, plastic, plaster, rubber, or spray metal in order to produce structural, composite plastic prototype parts.

An additional object of the invention is to provide a simple, low cost, one step method for producing a prototype part having equivalent visual and structural characteristics to the actual part to be commercially produced.

A further object of the invention is to provide a high temperature, high strength, composite, structural plastic mold for prototype and production runs.

SUMMARY

These and other objects are obtained with the present invention of the method for rapid prototyping parts in a composite, structural plastic.

To be able to take a liquid thermoset resin and simply pour it into a soft tool mold, such as a wax, plaster, plastic, rubber, or spray metal mold is obviously one of the quickest and least expensive methods for producing a desired prototype part. And, of course, this is done routinely if all that is required is a model of the part primarily for viewing purposes. This technique has not been available in the past when it was required not only to have a visual model, but also to have a "working" prototype capable of physically emulating the production part. The reason for this is that these molds traditionally accommodate only low temperature resistant and low stress resins.

Fiber reinforced composite, structural plastics do, of course, exist. Mixing quantities of glass fibers, graphite, KEVLAR®, and ceramics together with certain liquid resins prior to curing the plastic can produce molded parts with equivalent or superior structural qualities to metal parts. For example, in U.S. Pat. No. 4,848,292, issued Jul. 18, 1989, a cylinder head and engine block assembly formed from a fiber-reinforced phenolic resin, for use in an internal combustion is described. The method employed in this invention, however, utilized either compression or injection molding. In both of these processes dry resin powder and a reinforcing fiber are pre-mixed and formed into a shape that can be molded. In the molding process external heat applied to the resin and mold is necessary to melt the resin, and, in concert with the pressure, force the material into the mold. Heat required for these molding procedures range from 250–650° F., while pressure required ranges between 150–5,000 psi. Heat, as provided by external means, is the primary method used for completing the chemical transition to a fully crosslinked and cured polymer.

In the instant invention low viscosity thermoset resins, together with short fiber reinforcements, permit producing the same high quality composite, structural plastic in the simple, traditional soft tool molds ordinarily used for "visualization" model making. The method of the invention permits "no pressure" molding, with the object to be fabricated being fully cured by the action of a catalyst at relatively low exothermic resin temperatures. The thermoset resins that can be used include unsaturated polyester, phenolics, epoxy, urethanes, and vinyl ester resins. They are low enough in viscosity (100–3,000 cps) to allow mixing with high percentages of fiber reinforcement. Typical fiber reinforcements include glass fibers, graphite, KEVLAR®, ceramics, and metals. Typical fiber length is shorter than used in Resin Transfer Molding(RTM), e.g. milled, flake, 1/16', 1/8', and 1/4" in length. Fiber loadings of the liquid thermoset resins are typically 10–65% volume by weight. This combination of short fibers plus low viscosity thermoset resins makes possible low bulk density compounds that can simply be poured rather than be pushed under pressure to fill a mold.

A preferred low viscosity thermoset resin for use in the instant invention is phenolic. Phenolic resins are often preferred over other thermosets for a number of reasons. Their high mechanical and thermal stability are equal or superior to aluminum at operating temperatures. Creep resistance is significantly superior to other resins. Cost considerations often favor phenolics. Good chemical resistance and ability to withstand extreme atmospheric conditions further enhance their attractiveness for a wide variety of applications.

There are two categories of phenolics: (1) Novalacs; and (2) Resoles. Novalacs are thermoplastic materials that are made by heating phenol and formaldehyde in the presence of an acid catalyst, usually sulfuric or oxalic acid. The formaldehyde/phenol mole ratio must be less than one otherwise gelation will occur during manufacture. Novalacs are considered two stage resins since they need to be heated with the addition of formaldehyde in order to crosslink. Hexamine is the usual curing agent as it gives off the needed formaldehyde required to cause the gelation and crosslinking when heated.

The second category of phenolics are resoles and form the basis of the preferred phenolic resin of the present invention. Resoles are considered to be one stage resins. They are also manufactured by heating phenol and formaldehyde using an alkaline catalyst. The formaldehyde/phenol mole ratio must be greater than one. Because of the high formaldehyde ratio resoles may crosslink with only heat with no addition of formaldehyde such as is required by novalacs, where formaldehyde ratios are raised with hexamines. Alternatively, resoles may be completely cured without additional heat through the addition of strong acids, such as phosphoric and toluenesulfonic acids. Resoles may use either water or ethylene glycol as a solvent. Typical catalyst ratios are 2–20% by weight. Since phenolics are crosslinked through a condensation reaction, water is a by-product. The use of ethylene glycol as a solvent is preferred to minimize the amount of water in the cure process. Many offer the catalyst with water as the solvent. Typical glycol percentages by weight are 50% for the resin and 17% for the catalyst.

The steps involved in utilizing the method of the invention are basically simple. A liquid thermoset resin, catalyst and quantity of fiber material are first mixed in whatever order the operator prefers. The fiber-resin-catalyst mix is then de-aerated, and at an appropriate time the mixture is poured into a typical soft tool mold such as wax, plaster, plastic, spray metal, or rubber(for example, a mold may be made by first making a model or pattern of the object to be molded out of wood as in prior technology, or utilizing the negative or reverse of any of the aforementioned CAD computer technologies. The model is then cast in a liquid, or soft formable material such as wax, plaster, plastic, rubber or by direct spraying of a molten metal on the model. Typical procedures include using liquid resin, such as a polyurethane (mixed with a curing agent), or using a liquid wax or rubber formulation, such as silicone rubber (mixed with a curing agent), pouring the material over the model so as to encase the model in the soft tooling material and removing the encapsulating material when it cures to a solid, the model being held in a suitable container so as to be able to be freed of the encapsulating material without disturbing the impression the model has made in the encapsulating material. The soft tool mold making techniques are well known to the art, and form no part of this invention. Curing of the liquid resin—catalyst—fiber mixture is accomplished entirely by means of the action of the catalyst and the exothermic heat generated by the reaction between the resin and the catalyst. When the molded object is cured it is simply removed from the mold and the process may then be repeated as required.

It is to be noted that this same liquid resin, catalyst, and fiber mix method for producing prototype parts can also be used with equal economy and convenience to fabricate molds. Molds made with this process would be capable of withstanding temperatures up to 400° F. This composite, structural plastic mold can then be used for prototype or production runs for processing materials requiring high temperatures during the molding procedure, including, thermoplastics, such as nylon, and high, temperature—resistant, structurally reinforced thermoset plastics, such as phenolics and epoxies. The composite, structural plastic mold can be produced more quickly and economically than the typical soft tool mold, yet compete structurally with "hard" tool molds due to their greater strength and temperature resistance.

The advantages that are obtained utilizing the method of the invention are as follows:

(1) Composite, structural plastic prototypes can be fabricated having end—product, functional characteristics utilizing soft tool molds or rapid prototyping originally only employed for producing a model visually representing the object.

(2) A "working" prototype is produced easily and inexpensively.

(3) Design cycle time-to -market is significantly reduced.

(4) Design cycle cost is also significantly reduced by eliminating "test" prototype molding procedures.

(5) The prototype mold, typically costing between $250–$5,000 as compared to $100,000–$500,000 for a similar steel production mold, can often be used for actual production of the molded item, albeit oftentimes on a small scale basis.

(6) Composite, structural plastic molds can be fabricated as rapidly and economically as typical soft tool molds, the composite, structural plastic mold then being able to compete directly with costly "hard" tool molds for prototype or production runs, including materials traditionally requiring high strength molds capable of withstanding high temperatures, such as certain thermoplastics and structurally reinforced thermoset plastics.

Thus it can be seen that the rapid prototyping method of the invention producing composite, structural molds, or prototype plastic parts utilizing simple soft tool or rapid prototyping developed molds offers important new economies and speed in performance to virtually any industry in bringing new products to market. The lack of high temperatures and pressures in the method of the invention for processing low viscosity thermoset resins mixes, including reinforced fibers and catalysts, permits simply pouring them into traditional "visual aid" model making molds. However, the results of the invention in sharp contrast produce a "working" prototype, and, in some instances, the actual finished product ready for market.

DETAILED DESCRIPTION

Figure 1:
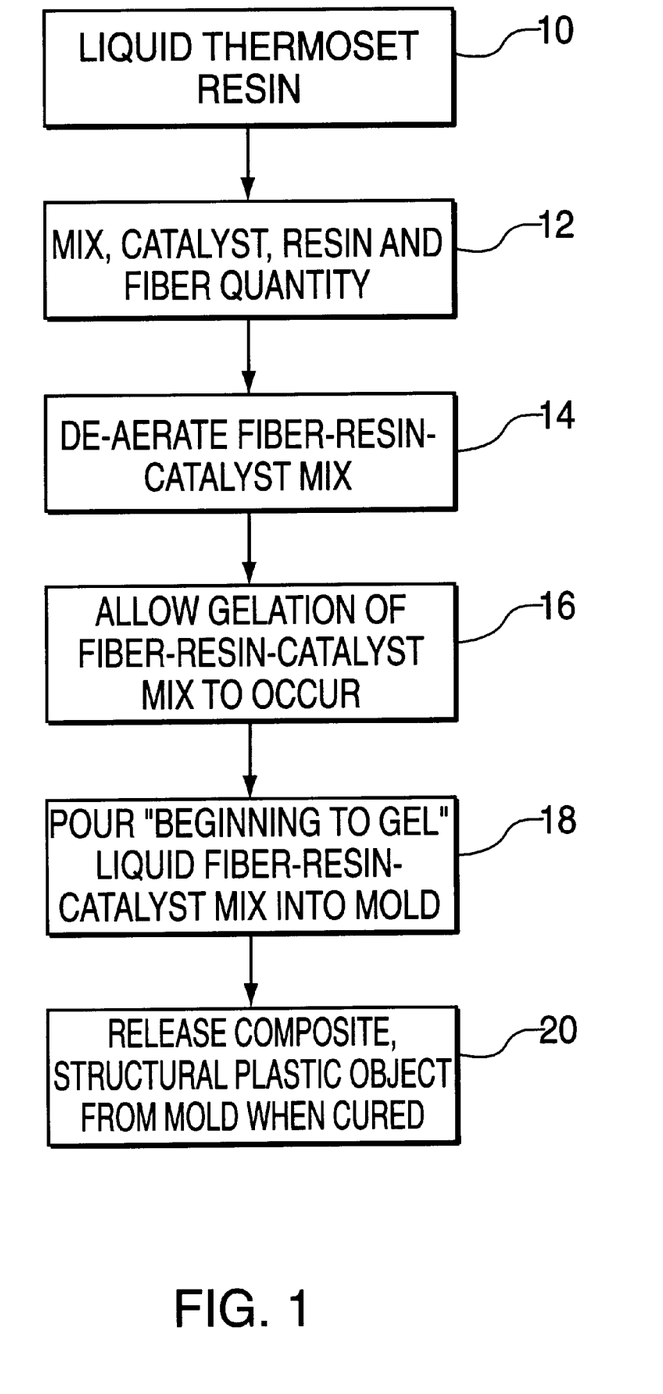
FIG. 1 is a flow chart outlining the steps involved in one version of the composite, structural plastic molding method of the invention.

Referring now to the drawings, in FIG. 1 a flowchart is given illustrating a typical procedure for molding composite, structural prototype plastic parts according to the invention. A liquid thermoset resin 10 is selected for the particular application. This liquid material can be a resole phenolic, unsaturated polyester, urethanes, epoxy, or vinyl ester resin, with the resole phenolic being preferred for the reasons given above. The resin can be handled in virtually any manner for convenient dispensing as is well known to the art.

As a suitable catalyst, resole phenolics generally require strong acids, such as phosphoric acid and toluenesulfonic acid to effect a complete cure. Resole phenolics usually require either water or ethylene glycol as the solvent. Typical catalyst ratios are 2–20% by weight.

The low viscosities of the resins allow mixtures with higher percentages of fiber reinforcement. Typical fiber loadings are 10–65% volume by weight. Reinforcement fibers can be glass fibers, graphite, KEVLAR®, ceramics or metals. Fiber lengths employed are relatively short compared with the resin transfer method above, being either milled, flake, 1/16', 1/8', or 1/4' in length. Typical fiber widths range between 10–40 microns, with 10 microns being a preferred width. It is essential to the method of the invention that relatively short fiber lengths described above be employed so as to combine with the low viscosity resin to produce low bulk density compounds that can be poured rather than pushed under pressure. However, woven, chopped, unidirectional, random and non-woven fibers may be added in selective parts of the mold to add additional structural integrity.

The second step 12 involves the mixing of the liquid resin, catalyst and quantity of reinforcing fibers. This can occur in any sequence: mix fiber and resin and then add catalyst; mix catalyst and fiber and add mixture to resin; or mixed catalyst and resin and then add fibers. There is no preferred way. A suitable mixer, such as a paddle type mixer, is employed to effect a thorough mixing of the ingredients.

The third step 14 of the method of FIG. 1 involves the step of de-aerating the fiber-resin-catalyst mix prior to pouring the mixture. Agitating the mixture in any convenient manner, such as rolling the mixture container or continuing to stir the mixture, or by vibrating the mixture, or all means of agitation can be combined. The container for the mixture can also be subjected to a vacuum at this time to assist in de-aerating the compound and the removal of any water from the compound given off during the cure cycle, which is critical to producing usable parts.

Step four, 16 of FIG. 1, involves judging the appropriate time to begin the pouring of the fiber-resin-catalyst mix into the mold depending upon the percentage of catalyst used. The mixture should not be poured into the mold cavity until its viscosity reaches the point at which it is just about to thicken through the crosslink process. Typical temperatures at this time, resulting from the exothermic reaction, are in the range of 100° F. to 130° F. Typical gelation cycle times may be from 15 seconds to 8 hours although the compound may not enter the mold until the last seconds of the reaction. For certain applications it may be desirable to heat the mixture and/or mold to a maximum temperature of +120° F. This is done to minimize the loss of heat created during the exothermic reaction.

In step five, 18 of FIG. 1, the fiber-resin-catalyst mixture that is just beginning to gel is poured into a suitable soft tool mold, such as the wax, plaster, plastic, spray metal, or rubber soft tool molds, or one developed using a particular rapid prototyping technique. Dispensing equipment, including automatic measuring and dispensing equipment that is well known to the art may be used to fill the mold(s). As noted above, the mold may be pre-heated to +120° F. in order to expedite curing. The mold may also be subjected to a vacuum to facilitate the complete filling of the mold during the pour of the mixture into the mold.

As depicted in step six, 20 of FIG. 1, the mold is disassembled, and the finished molded object is removed from the mold. If required, the finished object may be subjected to a post cure in an oven heated to up to +250° F. for one to two hours to insure complete curing and moisture removal.

Figure 2A:
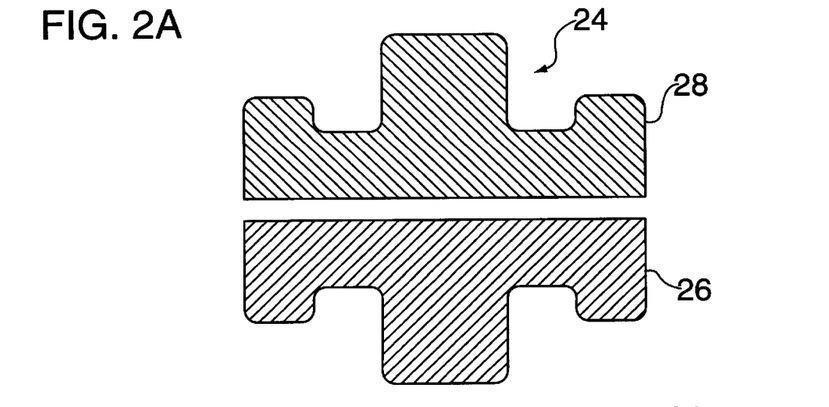
FIGS. 2A–2H illustrate a typical procedure for making and using a two part mold to produce plastic objects according to the method of the invention.
Figure 2B:
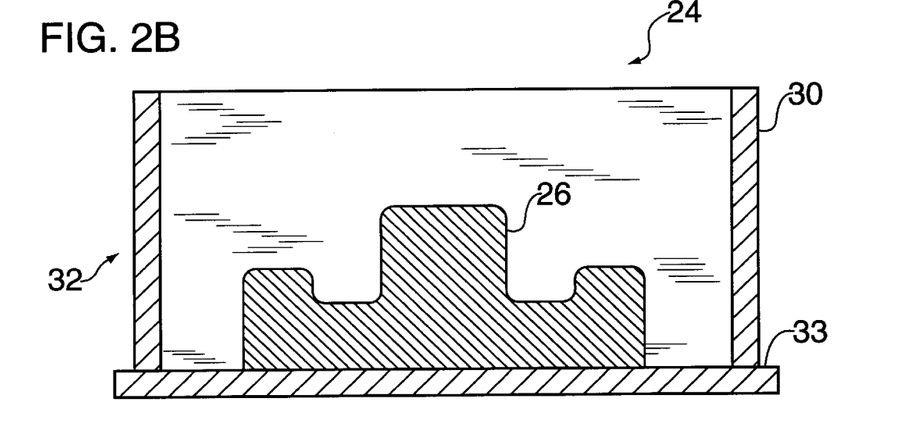
Figure 2C:
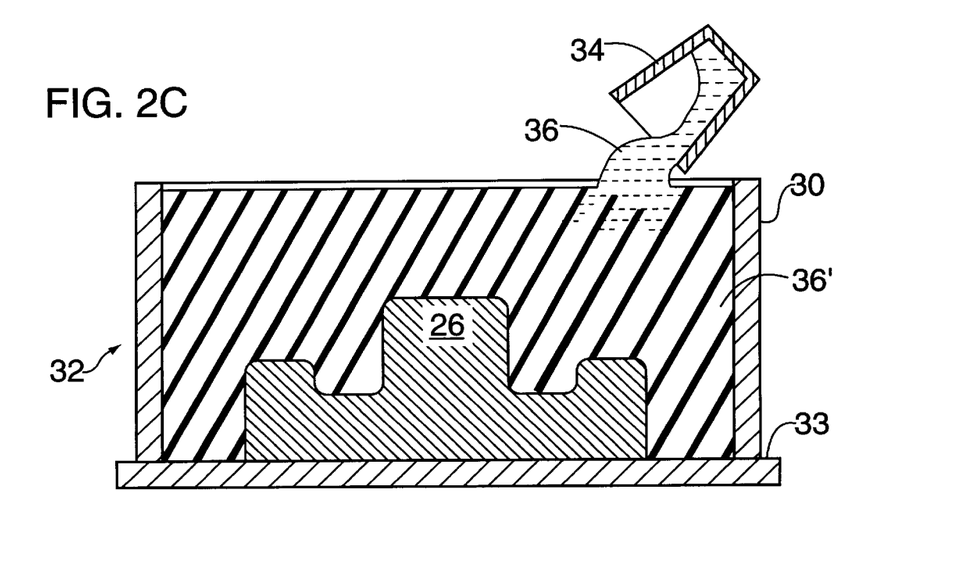
Figure 2D:
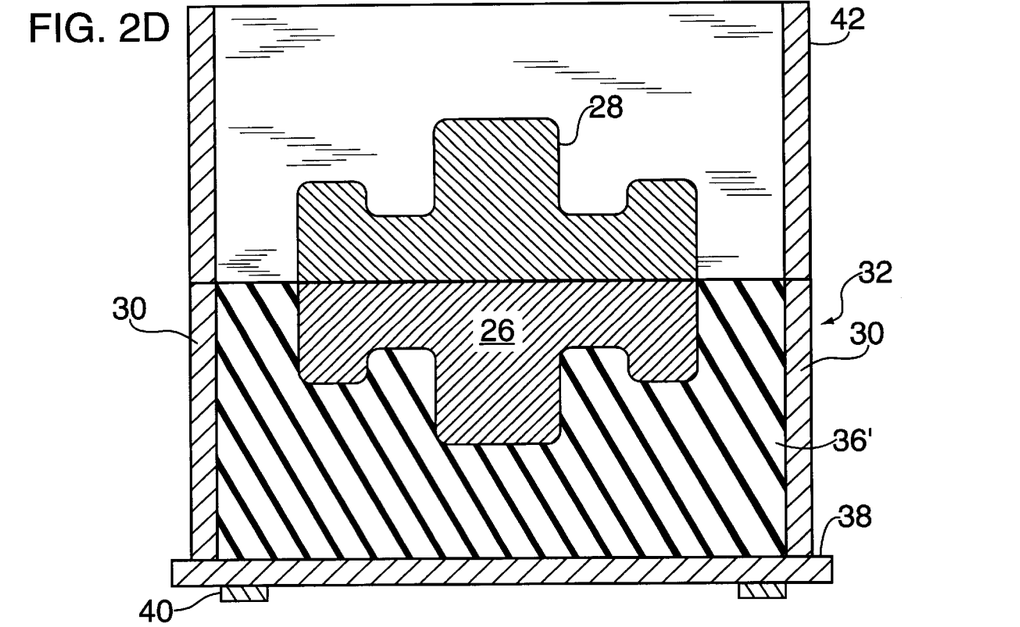
Figure 2E:
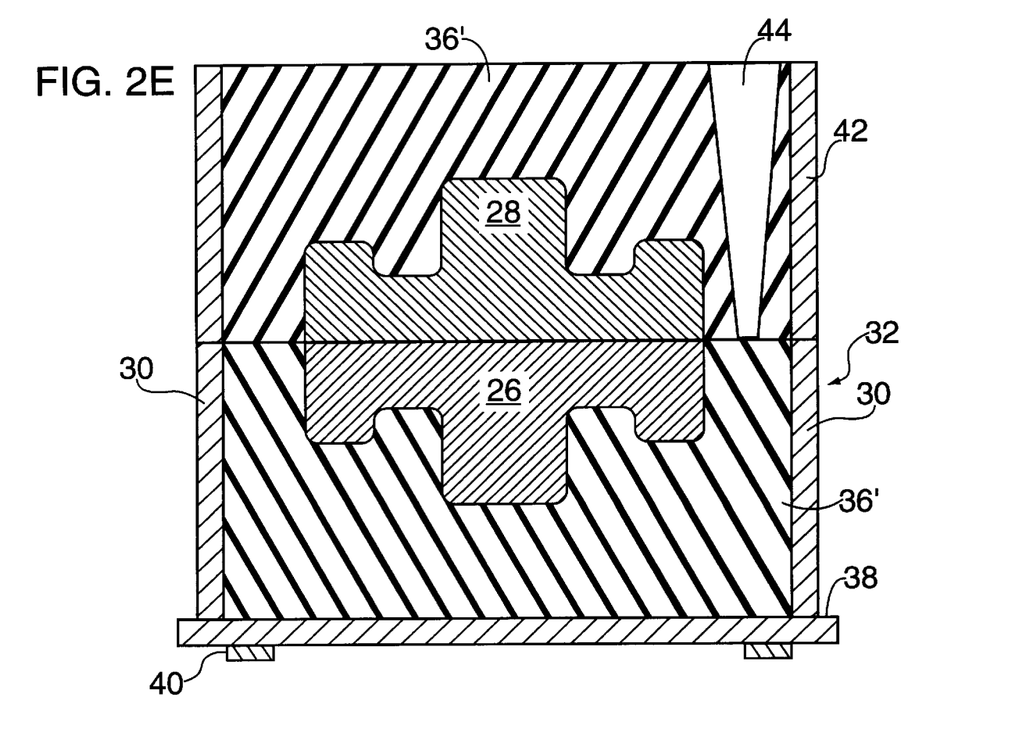
Figure 2F:
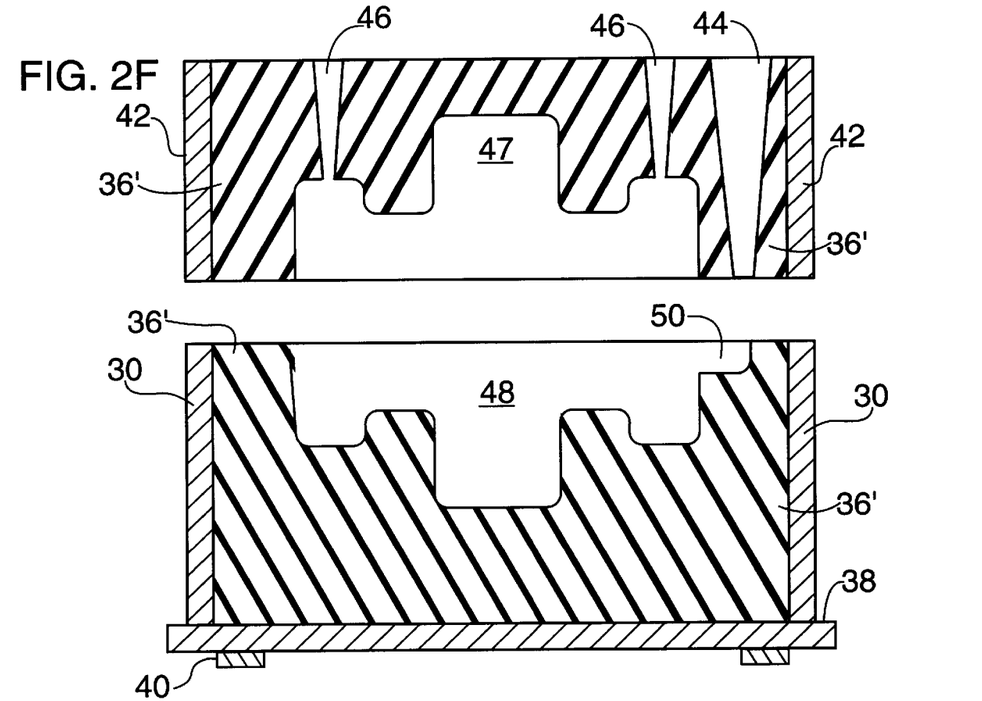

FIGS. 2A–2H illustrate making and using a particular type soft tool mold, such as a silicone rubber mold, in conjunction with the method of the invention. FIG. 2A shows a two piece pattern 24 (e.g., wood or metal) representing the object to be molded. In FIG. 2B the base portion 26 of the pattern is shown in place in a bottom portion of a mold box 32, the box to be formed with four sides, each side having a bottom portion 30 and a top portion 42 (see FIG. 2D). FIG. 2C shows a liquid silicone rubber-curing agent mixture 36 filling the bottom portion of the box making use of a beaker 34 to pour the liquid rubber around the base pattern 26. FIG. 2D shows the removable mold box base 33 of FIG. 2C as having been removed after the rubber has cured to a solid rubber 36', the half mold box sides 30 and base pattern 26 being turned 180° and placed on a permanent mold box base 38 with supporting feet 40, and with the top side portions 42 in place on top of the bottom side portions 30, and finally with the top pattern half 28 now positioned in place on the base pattern half 26. In FIG. 2E the top half of the mold box is shown filled with now cured rubber 36', with a funnel shaped opening 44 having been cut or formed in the cured silicone rubber running the depth of the top half of the mold box. In FIG. 2F the top sides 42 of the mold box are shown raised from the bottom sides 30 so as to permit the removal of both halves of the pattern from the mold. This rubber filled top half of the mold box is now shown having two vent holes 46 having been cut in the cured rubber down to the top half of the now empty top mold configuration 47, and with the bottom half of the rubber filled mold box with the now empty base mold configuration 48 having a lateral cut out 50 in the rubber so as to form a channel with the funnel shaped opening 44 in the top half of the mold box when joined. The procedure described to this point has concerned the preparation of a so-called soft tool mold. As noted above, various rapid prototyping techniques can be employed to develop the mold(using the reverse or negative of the imagery used for model development).

Figure 2G:
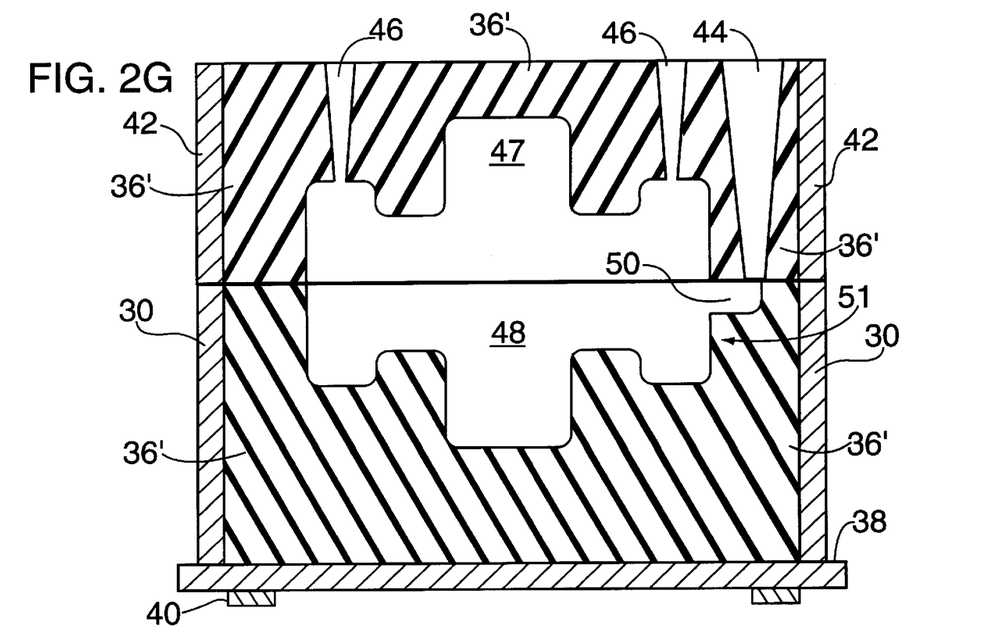
Figure 2H:
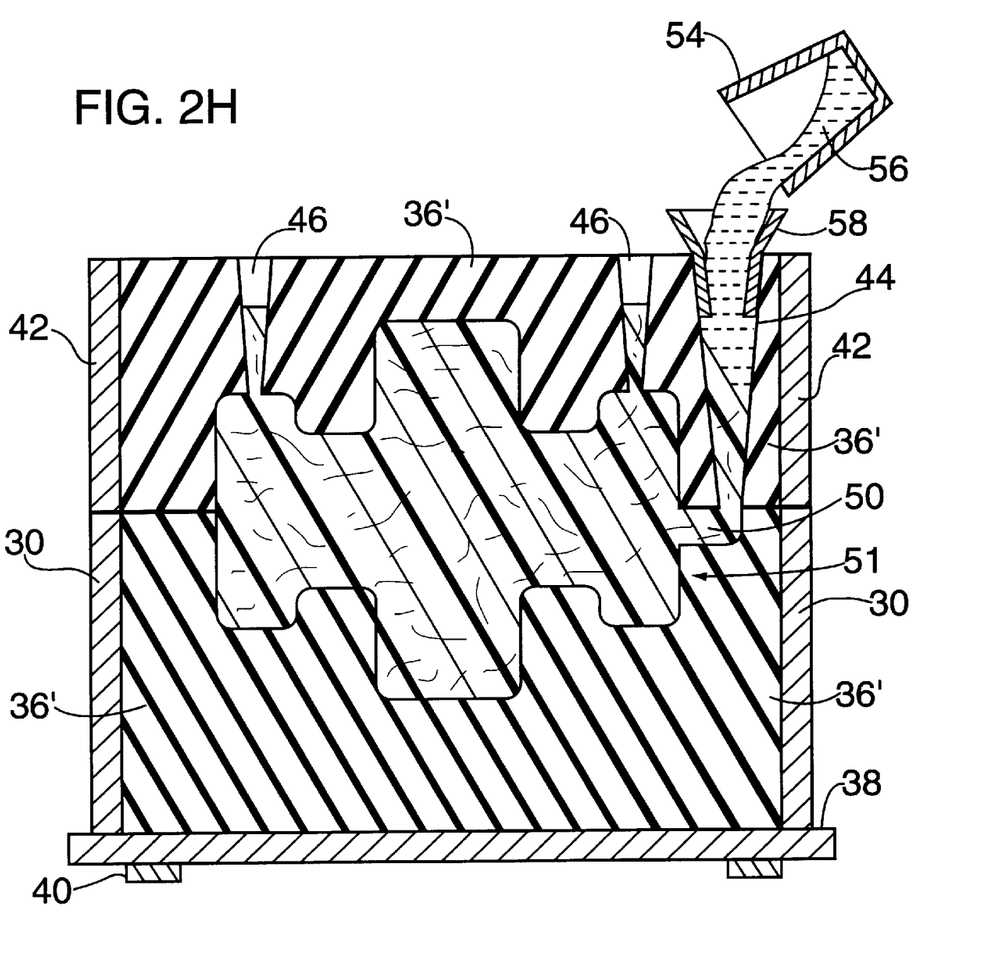

FIG. 2G shows the completely prepared mold just before pouring of the liquid resin. The two empty mold configuration halves 47, 48 are now joined together forming one complete mold configuration 51.

The fiber-resin-catalyst mixture prepared according to the procedures outlined in FIG. 1 can now be poured into the mold, as, for example, by placing the liquid plastic mixture into a beaker 54 (FIG. 2H), then pouring the liquid plastic 56 into the mold making use of a funnel 58 placed in the funnel shaped opening 44 in the top half of the mold. In this manner the liquid plastic mixture fills the mold, is permitted to cure within the mold, and then the two rubber mold sections are separated, releasing the finished composite, structural plastic object 52.

Due to the lower temperatures encountered in the method of the invention, traditional high temperature mold release agents can be employed as well as simple, low temperature "barrier coatings" such as, for example, a polyethylene film.

The following is a typical "formulation and procedure" for utilizing the method of the invention:

(A) Resin: Liquid resole phenolic resin, having the following formula

| | |
|---|---|
| Phenol formaldehyde polymer | 70–80% |
| Ethylene glycol | 10–12% |
| Phenol | 7–10% |
| Formaldehyde | 1–3% |

(B) Resin viscosity 500 cps (C) Mix in acid catalyst at room temperature in a 15% by weight ratio. A typical catalyst composition would be

| | |
|---|---|
| p-tolueneulfonic acid | 44% |
| Phosphoric acid | 3% |
| Ethylene glycol | 53% |

Mix resin and catalyst together using a standard paddle type mixer (available from the Jiffy Mixer Corp., of Riverside, Calif.).

(D) Add and blend in a milled glass fiber fiber in a volume of 60–65% by weight using the same paddle type mixer.

(E) De-aerate the fiber-resin-catalyst mix by continuing to swirl the mixture in its container. In this example shelf life at room temperature before the mixture becomes too viscous to pour is 10–12 minutes.

(F) Monitor fiber-resin-catalyst mixture temperature. Pour into soft tool mold at a maximum of +130° F. as mixture starts to gel.

(G) After hardening, remove from mold.

(H) Heat treat the composite, structural plastic product at +250° F. for one hour to remove all moisture.

The above mentioned resins and catalysts are available from BP Chemicals, Georgia-Pacific Co., and Ashland Chemical Co. The milled glass fibers is available from Owens-Coming Co., and Fibertec Co.

As has been noted above, this same fiber-resin-catalyst mixture for prototype part production as outlined in FIG. 1 can be used to fabricate molds for similar use in prototype part fabrication, or for more demanding applications requiring greater mold strength and high temperature resistance which would render typical soft tool or rapid prototyping molds unacceptable. For example, the same mold making method illustrated in FIGS. 2A–2H for typical soft tool mold fabrication can be employed for the composite, structural plastic mold. Instead of the liquid silicone rubber-curing agent mixture 36 of FIG. 2C, a suitable fiber-resin-catalyst mixture (such as, for example, fiber-resin-catalyst mixture 56 illustrated in FIG. 2H) can be employed to fill the bottom portion of the mold box 32, with the beaker 34 now serving as the means for pouring the fiber-resin-catalyst mixture into the mold box, thereby encapsulating the base pattern 26 in the composite, liquid plastic. FIG. 2D would then illustrate the removable mold box base 33 of FIG. 2C as having been removed after the fiber-resin-catalyst mixture has cured to a solid plastic, in place of the solid rubber 36', with the half mold box sides 30 and base pattern 26 being turned 180° and placed on a permanent mold box base 38 with supporting feet 40, and with the top side portions 42 in place on top of the bottom side portion 30, and finally with the top pattern half 28 now positioned in place on the base pattern half 26. FIG. 2E would then illustrate the top half of the mold box being shown filled with cured, solid composite, structural plastic, with the funnel shaped opening 44 having been drilled out of the cured plastic (instead of being cut or formed out of the cured silicone rubber), running the depth of the top half of the mold box. FIG. 2F would then represent the top sides 42 of the mold box as being raised from the bottom sides 30 so as to permit the removal of both halves of the pattern from the mold. The cured, composite plastic filled top half of the mold box is now shown having two vent holes 46 having been drilled in the cured, composite plastic down to the top half of the now empty top mold configuration 47, and with the bottom half of the cured, composite plastic filled mold box with the now empty base mold configuration 48 having a lateral drilled out area 50 in the cured, composite plastic so as to form a channel with the funnel shaped opening 44 in the top half of the mold box when joined. FIG. 2G would then illustrate the completely prepared mold configuration halves 47, 48 now joined together forming one complete mold configuration 51.

Finally, FIG. 2G can now represent a complete, cured, composite plastic mold. This composite, structural plastic mold can now be utilized for the production of prototype parts as previously described and illustrated in FIG. 2H. Alternatively, composite, structural plastic molds can be used competitively for prototype or production runs normally employing "hard" tool molds, such as steel production molds. Thermoplastic materials, such as nylon, and high temperature resistant structural reinforced thermoset plastics, such as phenolics and epoxies, which require high strength molds to withstand temperatures up to 400° F., can now be processed in this composite, structural plastic mold.

Thus a new method for rapidly and economically prototyping plastic parts is provided in the present invention. "Working" prototypes are produced with the same low cost and speed previously attainable only for non-functional "visual" prototyped parts. Reinforced thermoset resins are simply poured into molds made by existing techniques, producing prototype parts having equivalent visual and physical qualities to the actual part to be commercially produced. And for some applications the prototyped part becomes in fact the commercial product. In addition the same reinforced thermoset resins can be employed to fabricate molds equivalent in convenience and economy to soft tool molds, yet possessing sufficiently enhanced temperature resistance and physical strength so as to be able to directly compete with "hard" tool molds for many prototype or production applications.

While the present invention has been disclosed in connection with versions shown and described in detail, various modifications and improvements thereon will become readily apparent to those skilled in the art. Accordingly, the spirit and scope of the present invention is to be limited only by the breadth of the following claims.

What is claimed is:

1. A method of fabricating at least one solid composite, structural prototype plastic part having visual and structural characteristics equivalent to those of an actual part to be commercially produced, comprising the steps of:

a.) providing a mold selected from the group of soft tool molds ordinarily used for visualization model making, consisting of wax, rubber, plaster, spray metal and plastic molds, said mold having a pre-defined cavity therein conforming to a structural part configuration;

b.) selecting a liquid thermoset resin composition;

c.) combining said composition with a plurality of short reinforcement fibers into a flowable mixture;

d.) bringing said mixture to a viscosity so as to produce a low bulk density compound that can be poured;

e.) pouring said compound into said cavity at a time when gelation of said composition is about to occur;

f.) allowing said mixture to cure to form said solid composite structural prototype plastic part; and g.) removing said solid composite structural prototype plastic part from said mold.

2. The method of claim 1 further including the step of de-aerating said mixture prior to said pouring step.

3. The method of claim 2 wherein said de-aerating step includes applying vacuum to said composition.

4. The method of claim 3 further including the step of heating said mixture to minimize heat loss therefrom.

5. The method of claim 3 further including the step of heating said mold to a predetermined temperature to minimize heat loss from said mixture.

6. The method of claim 1 wherein said pouring step is effected when said mixture has a temperature that is less than or equal to 130° F.

7. The method of claim 1 further including the step of post-curing said structural prototype plastic part.

8. The method of claim 1 wherein said post-curing step includes heating said structural prototype plastic part to a predetermined temperature for a time sufficient to effect a complete cure of said composition.

9. The method of claim 1 wherein said reinforcement fibers are glass fibers.

10. The method of claim 9 wherein each of said reinforcement fibers has a length not exceeding ¼'.

11. The method of claim 1 wherein said thermoset resin is selected from the group consisting of resole phenolic, unsaturated polyester, urethanes, epoxy and vinyl ester resins.

12. The method of claim 1 further comprising the step of combining said mixture with a catalyst .

13. The method of claim 12 wherein said catalyst is selected from the group consisting of toluene sulfonic acid and phosphoric acid.

14. The method of claim 1 further comprising the step of post-curing said thermoset resin after said removing step.

15. The method of claim 1 wherein said mold is fabricated from said mixture.

* * * * *

UNITED STATES PATENT AND TRADEMARK OFFICE
CERTIFICATE OF CORRECTION

PATENT NO.    : 6,103,156
DATED         : August 15, 2000
INVENTOR(S)   : Matthew W. Holtzberg Page 1 of 1

It is certified that error appears in the above-identified patent and that said Letters Patent is hereby corrected as shown below:

Column 3,
Line 19, incorrectly reads "1/16', 1/8' and 1/4" in length." The patent should correctly read -- "1/16", 1/8", or 1/4" in length --.

Column 5,
Line 47, incorrectly reads "flake, 1/16', 1/8' and 1/4' in length." The patent should correctly read -- flake, 1/16", 1/8", or 1/4" in length --.

Column 7,
Line 52, incorrectly reads "milled glass fiber fiber in a". The patent should correctly read -- milled glass fiber in a --.

Column 10,
Line 21, incorrectly reads "1/4".

Claim 10,
Line 21, should correctly read --1/4" --

Signed and Sealed this

Twenty-fifth Day of September, 2001

Attest:

*Nicholas P. Godici*

NICHOLAS P. GODICI
*Attesting Officer*    *Acting Director of the United States Patent and Trademark Office*

UNITED STATES PATENT AND TRADEMARK OFFICE
CERTIFICATE OF CORRECTION

PATENT NO. : 6,103,156
DATED : August 15, 2000
INVENTOR(S) : Matthew W. Holtzberg

It is certified that error appears in the above-identified patent and that said Letters Patent is hereby corrected as shown below:

<u>Column 3,</u>
Line 19 reads "1/16', 1/8' and 1/4" in length." should read -- "1/16", 1/8", or 1/4" in length --.
Line 47, reads "flake, 1/16', 1/8', and 1/4" in length." should read -- flake, 1/16", 1/8", or 1/4" in length --.
Line 52, reads "milled glass fiber fiber in a" should read -- milled glass fiber in a --.

<u>Column 10,</u>
Line 21, reads "1/4'" should read -- 1/4" --.

Signed and Sealed this

Nineteenth Day of October, 2004

JON W. DUDAS
*Director of the United States Patent and Trademark Office*